United States Patent [19]
Mori et al.

[11] Patent Number: 5,115,353
[45] Date of Patent: May 19, 1992

[54] MIRROR APPARATUS

[75] Inventors: Kelji Mori, Kariya; Hidekazu Kogita, Toyota, both of Japan

[73] Assignee: Aisin Seiki Kabushiki Kaisha, Kariya, Japan

[21] Appl. No.: 591,229

[22] Filed: Oct. 1, 1990

[30] Foreign Application Priority Data

Sep. 30, 1989 [JP] Japan .................................. 1-256634

[51] Int. Cl.[5] .................................................. G02B 7/18
[52] U.S. Cl. .................................. 359/871; 359/514; 248/466; 248/478
[58] Field of Search ............... 350/681, 589, 590, 582; 248/466, 478

[56] References Cited
U.S. PATENT DOCUMENTS

| | | | |
|---|---|---|---|
| 822,810 | 6/1906 | Zalinski | 248/466 |
| 3,171,683 | 3/1965 | Ludwig | 350/582 |
| 3,291,435 | 12/1966 | Herr | 350/631 |
| 3,802,766 | 4/1974 | Maci | 350/631 |

Primary Examiner—Bruce Y. Arnold
Assistant Examiner—J. P. Ryan
Attorney, Agent, or Firm—Burns, Doane, Swecker & Mathis

[57] ABSTRACT

A mirror apparatus includes a holder formed into a cup-shaped configuration and having an opening enclosed by a holding portion which is in the form of an inward projection. A mirror is disposed within the holder and has an outer surface exposed through the opening and a rear surface. A supporting member engages with the rear surface of the mirror in a surface-to-surface manner and permits transmission of ultrasonic vibrations. An elastic device urges the mirror on the holding portion via the supporting member independently from deformation of holder.

1 Claim, 5 Drawing Sheets

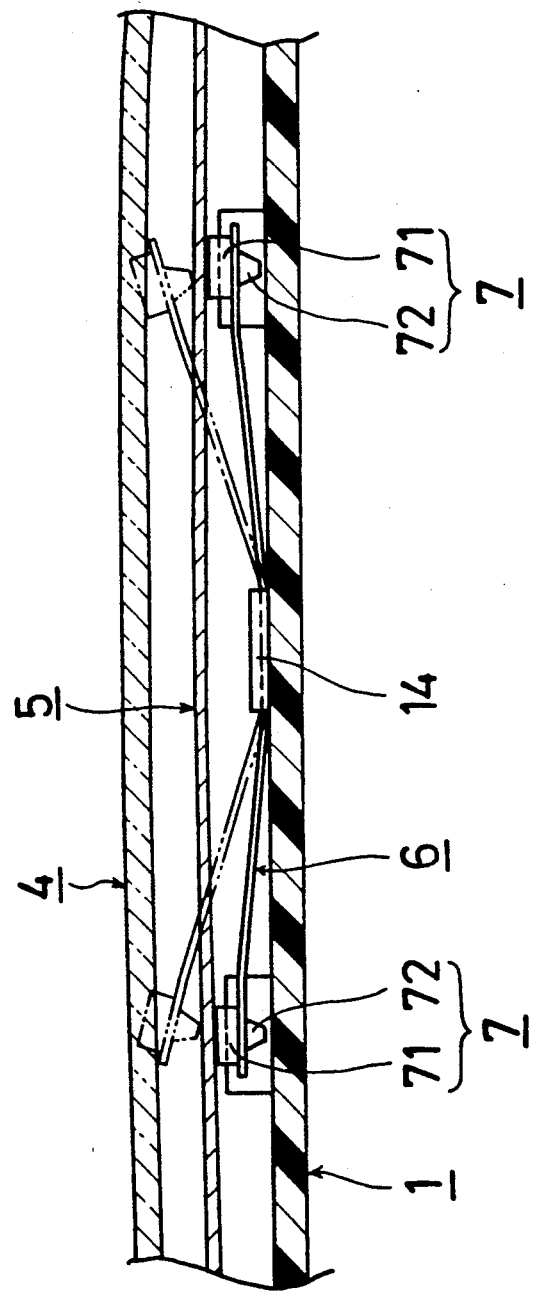

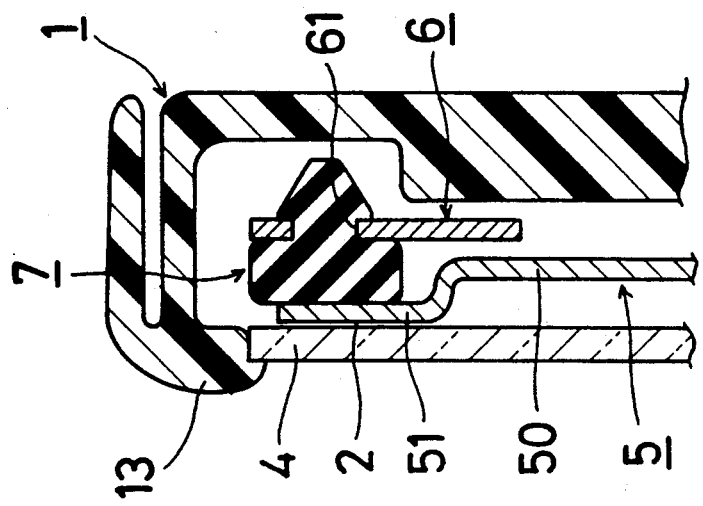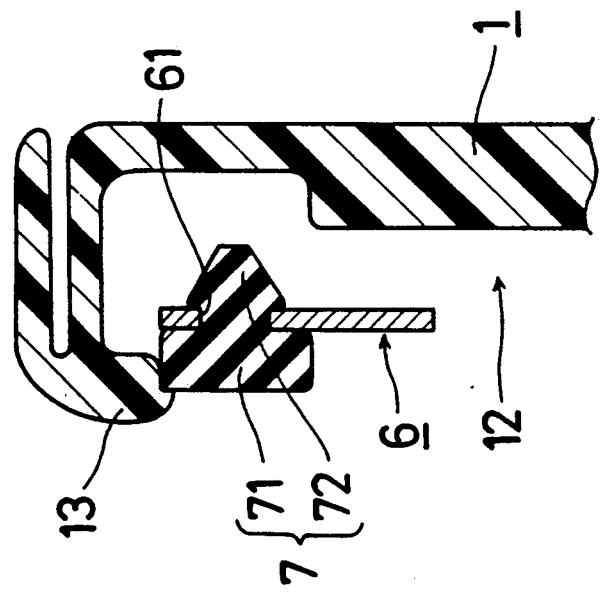

MIRROR APPARATUS

BACKGROUND OF THE INVENTION

1. Field of the Invention

The present invention relates to a mirror apparatus and in particular to a mirror apparatus for a vehicle.

2. Description of the Related Art

Japanese Utility Model Laid-Open Print No. 61-85538, published without examination on Jun. 5, 1986, discloses a mirror apparatus to be mounted on a vehicle. The disclosed mirror apparatus includes a shallow cup-shaped holder having a main portion and a holding portion which is formed integrally therewith. The holding portion is formed into an encircled inward projection and an opening is defined by the holding portion to be opposed to the main portion. A mirror is disposed within the holder and is held between the holding portion and a plurality of projections formed integrally with the main portion.

For reliably holding the mirror, an adequate elastic force should be derived or obtained from each of the projections. In light of the fact that each projection, which is formed integrally with the main portion of the holder, is subject to deformations due to the deformation with age of the holder per se, the elastic force of each projection for urging the mirror toward the holding portion has to be set at a large value. This means that the ultrasonic vibrations cannot be transmitted efficiently to the mirror when foreign substances such as rain drops on the mirror are to be removed therefrom.

SUMMARY OF THE PRESENT INVENTION

It is an object of the present invention to provide a mirror apparatus without the foregoing drawback.

It is another object of the present invention to provide a mirror apparatus in which the ultrasonic vibration can be transmitted efficiently to a mirror.

The foregoing objects are attained by a mirror apparatus having a holder formed into a cup-shaped configuration and having an opening enclosed by a holding portion which is in the form of an inward projection. A mirror is disposed within the holder and has an outer surface exposed through the opening and a rear surface. A supporting member engages with the rear surface of the mirror in a surface-to-surface manner. An elastic device urges the mirror on the holding portion via the supporting member independently from deformation of the holder.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein:

FIG. 3 is a cross-sectional view taken along line X—X in FIG. 1;

FIG. 4 which includes FIG. 4 (a) and FIG. 4 (b) is a view for showing a mirror provided with the holder.

DETAILED DESCRIPTION OF PREFERRED EMBODIMENTS OF THE INVENTION

Figure 1:
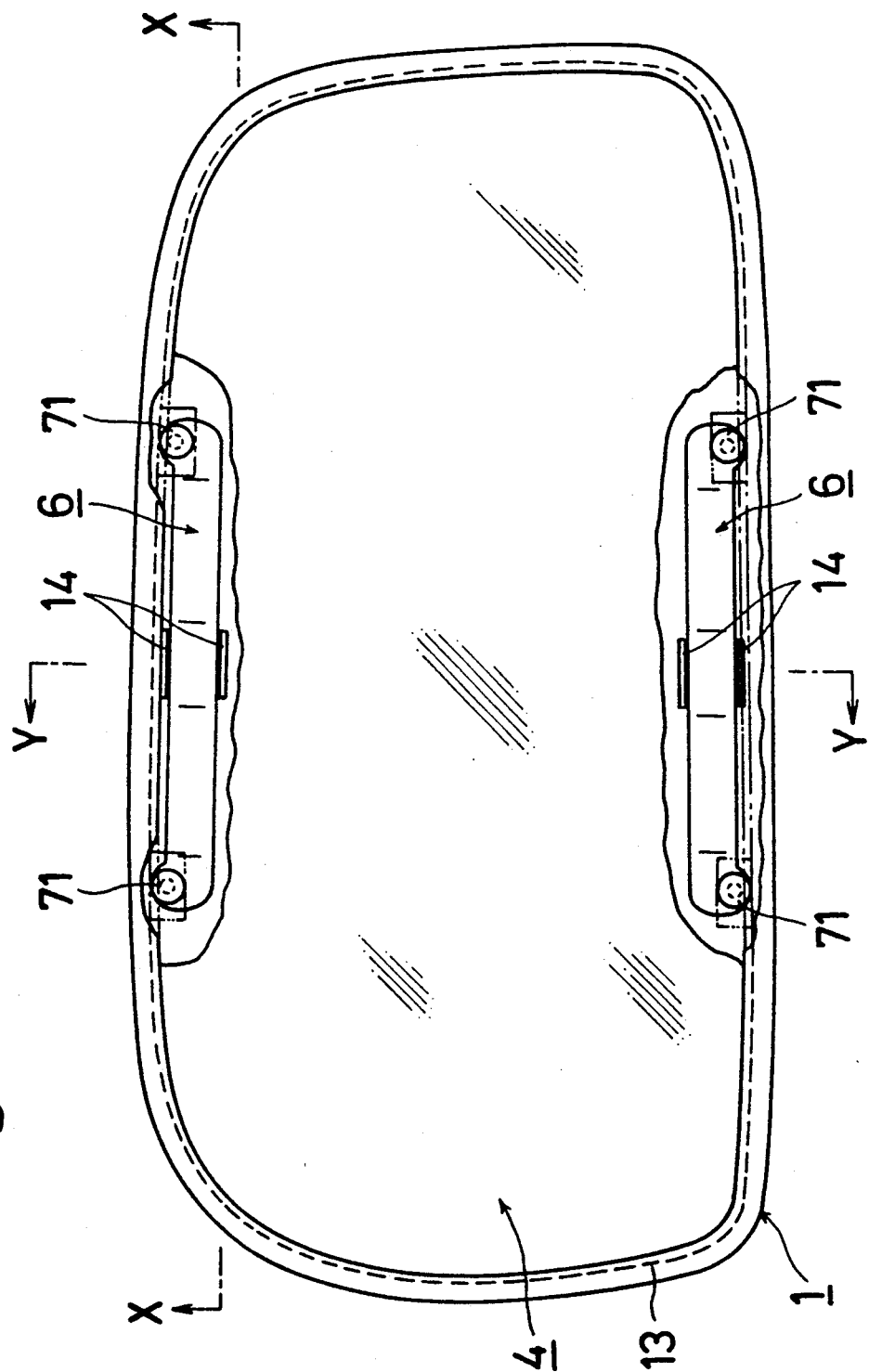
FIG. 1 is a front view of a mirror apparatus according to an embodiment of the present invention.

Referring now to FIG. 1, a mirror apparatus according to one embodiment of the present invention includes a holder 1 which is made of synthetic resin, formed by injection molding. The holder 1 is formed into a shallow cup-shaped configuration and has a holding portion 13 in the form of a radially inwardly directed projection which defines therein an opening 12.

Within the holder 1, there is disposed a convex mirror 4 with a predetermined curvature. The holder 1 is fixedly mounted on a vehicle-body (not shown) via a support (not shown).

The mirror 4, as is well-known, has an upper layer or an upper transparent member which is exposed outside through the opening 12 and a lower layer or reflecting layer adhered to a rear surface of the upper layer by a metal-evaporating method, for example.

Though the outer peripheral configuration of the mirror 4 is similar to an entire configuration of the opening 12 in shape, the former is slightly larger than the latter so that the mirror 4 can be held by the elastic force of the holding portion 13 of the holder 1.

Figure 2:
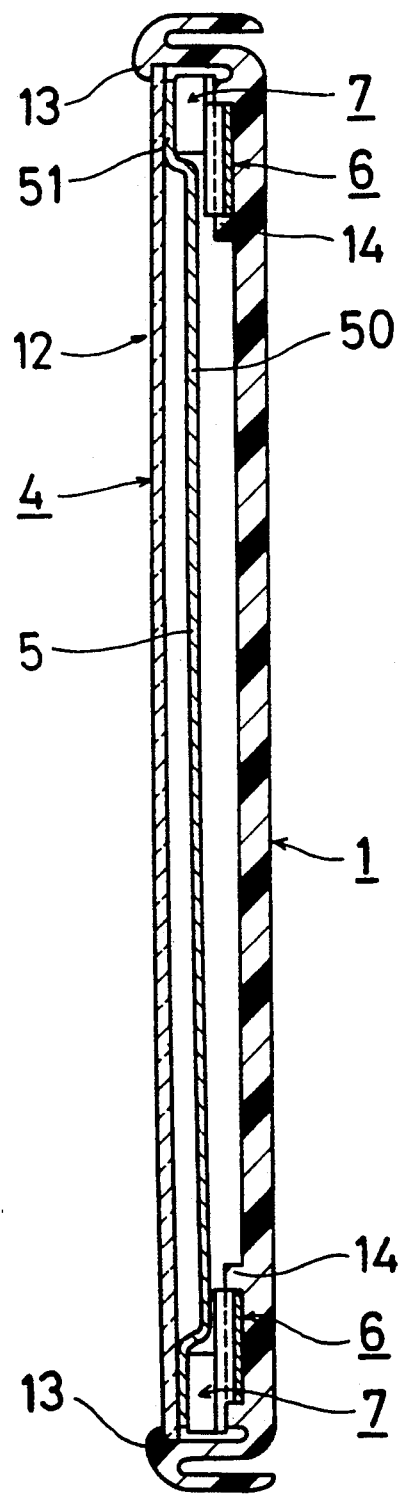
FIG. 2 is a cross-sectional view taken along line Y—Y in FIG. 1.

As shown in FIGS. 2 and 3, a supporting member 5 is arranged at a rear side of the mirror 4 and is similar to the mirror in scale and coefficient of linear expansion.

The supporting member 5 includes, at its central portion, a main body 50 having a curvature substantially equal to the curvature of the rear-side of the mirror 4 and a connecting portion 51 surrounding the main body 50 around its periphery and contacting with the rear side of the mirror 4 along its outwardly directed surface. A narrow space with a constant width is defined between the mirror 4 and the main body 50 of the supporting member 5. The thickness of the bonding agent which connects the portion 51 to the mirror 4 is intended to be even or constant along the entire periphery of the mirror 4 in order to prevent deformation thereof. An ultrasonic vibrator (not shown) is connected to the main body 50 in a known manner.

A pair of projections 14, 14 are formed integrally with the holder 1 at an upper central portion and a lower portion thereof and a leaf spring 6 is snugly held between the projections. Each end of the leaf spring 6 is formed into a gentle slope. At a distal end of each slope, a rubber or elastomeric buffer member 7 is provided. As best shown in FIG. 4, the buffer member 7 has a cylindrical portion 71 and a conical portion 72 snugly passing through an aperture 61. The leaf spring 6 and the buffer member 7 constitute elastic means.

Before the mirror 6 and the supporting member 5 are mounted to the holder 1, the buffer member 7, at its cylindrical portion 71, is in elastic engagement with the holding portion 13 of the holder 1 as shown in FIG. 4(a) and FIG. 4 (b).

When the mirror 4 and the supporting member 5 secured thereon are urged against the leaf spring 6 after the mounting of the mirror 4 and the supporting member 5 is in contact with the cylindrical portion 71 of the buffer member 7, a portion of the mirror 4 and the supporting member 5 is brought into position inside of the holding portion 13 of the holder 1 after passing the elastic inner periphery of the holding portion 13. When the portion of the mirror 4 and the supporting member 5 is released upon complete insertion within the holder 1, the portion is urged toward the holding portion 13 by the leaf spring 6 and is held therebetween.

In the foregoing embodiment, due to the fact that the elastic means is not affected by deformation due to age of the holder 1, the mirror can be held between the holding portion 13 and the supporting member 51 to which a continuous elastic force is applied from the elastic means. Thus, the force is not set at a large value, thereby establishing the efficient transmission of the ultrasonic vibrations to the mirror so as to provide for proper cleaning. It is noted that the sonic impedance of the leaf spring can be set by varying the rating thereof by changing the length or the elastic coefficiency. This means that suitable impedance of the leaf spring 6 prevents transmission of vibrations from the vehicle during vehicle travel.

Figure 5:
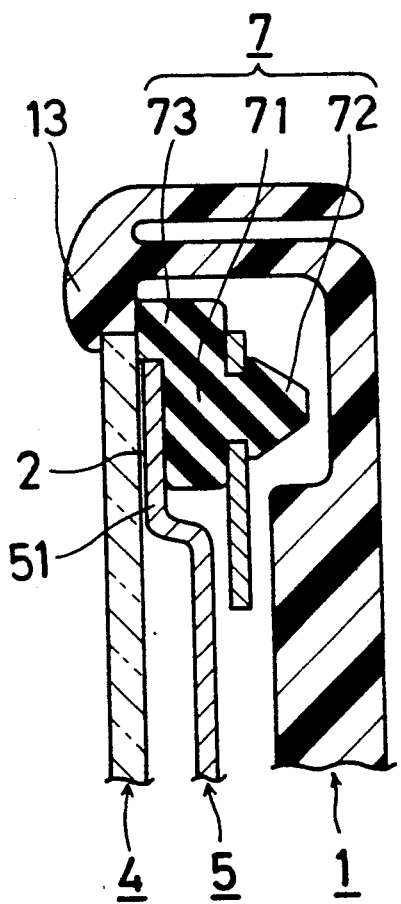
FIG. 5 is a partial sectional view of a mirror apparatus according to another embodiment of the present invention.

As shown in the further embodiment of FIG. 5, the buffer member 7 can be provided with an extended portion 73 which can be in overlaying engagement with both the holding portion 13 and the mirror 4.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A mirror apparatus, comprising:
   a holder having a cup-shaped configuration with an opening enclosed by a holding portion defined by an inward projection;
   a mirror disposed within the holder and having an outer surface exposed through the opening and a rear surface;
   a supporting member engaging with the rear surface of the mirror;
   leaf spring means for urging the mirror to the holding portion via the supporting member independent from deformation of the holder, end portions of the leaf spring urging the supporting member and a central portion secured to the holder; and a buffer member secured to each end portion of the leaf spring so as to be engaged with the supporting member and the holding portion.

* * * * *